Figure 1:
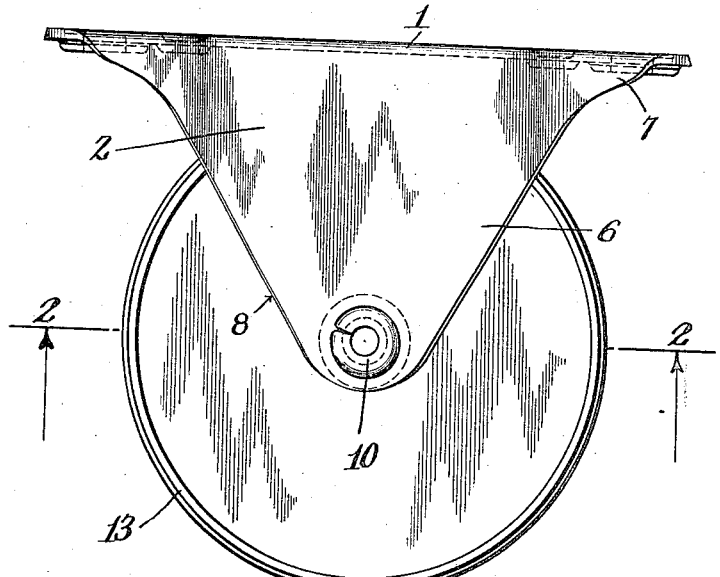

W. F. HEROLD.
CASTER FOR TRUCKS, ETC.
APPLICATION FILED MAR. 23, 1921.

1,410,676.

Patented Mar. 28, 1922.

Inventor
Walter F. Herold
By his Attorney

UNITED STATES PATENT OFFICE.

WALTER F. HEROLD, OF NEWARK, NEW JERSEY, ASSIGNOR TO THE BASSICK COMPANY, OF BRIDGEPORT, CONNECTICUT, A CORPORATION OF CONNECTICUT.

CASTER FOR TRUCKS, ETC.

1,410,676.  Specification of Letters Patent.  Patented Mar. 28, 1922.

Application filed March 23, 1921. Serial No. 454,968.

*To all whom it may concern:*

Be it known that I, WALTER F. HEROLD, citizen of the United States, and resident of Newark, in the county of Essex and State of New Jersey, have invented certain new and useful Improvements in Casters for Trucks, Etc., of which the following is a specification.

My invention relates to improvement in casters which are particularly adapted for use in trucks which are used for transporting articles from one place to another in industrial establishments, and for use in other heavy movable articles. For such use, casters have been developed having cast iron frames comprising a base portion which is secured underneath the article to be supported and downwardly extending side flanges in which the axle for the caster wheel is supported. Such constructions, however, are not able uniformly to withstand the strain to which they are subjected unless the parts are made unduly heavy and cumbersome.

The object of the present invention is to provide a light and strong construction, which may effectively be made of steel, which construction will be simple and comparatively inexpensive to manufacture and well adapted to withstand the heavy service to which it may be subjected in use. I accomplish this by providing a well braced construction in which the axle for the wheel extends through openings in the downwardly extending side flanges of the frame, this axle member being surrounded by a sleeve on which the wheel is mounted. The ends of the sleeve abut against the inner face of the frame in side flanges, and the ends of the inner axle member arm firmly secured to the frame side flanges, preferably by pressing the outer ends of the axle member radially outwardly, or otherwise enlarging the same so as to provide surfaces which will engage against the outer surfaces of the frame side flanges. With this construction the lower ends of the side flanges are rigidly braced against movement inwardly or outwardly so that the caster wheel is supported by a frame which may be termed a rigid box construction.

In the preferred embodiment of my invention also, the side flanges of the supporting frame are outwardly curved in cross section so as to greatly stiffen the same against the direct vertical thrust of the weight supported by the caster.

The principal object of my invention accordingly is to provide an improved construction of the character referred to. Other objects of my invention reside in various improved details of construction and in the combination of parts hereinafter more fully described in the following specification and particularly pointed out in the appended claims.

Figure 2:
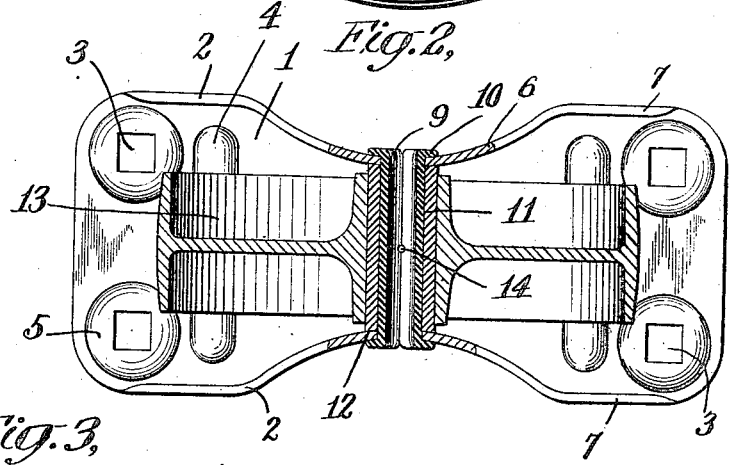
Figure 3:
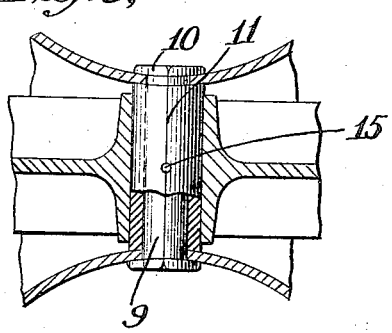

In order that my invention may be more fully understood, attention is hereby directed to the accompanying drawings forming part of this application and illustrating one embodiment of my invention. In the drawings Fig. 1 represents a side elevation of a caster embodying my invention, Fig. 2 represents a horizontal section taken on the line 2—2 of Fig. 1, and Fig. 3 is an enlarged detail of construction shown partly in plan and partly in section on the line 2—2 of Fig. 1.

Referring to the drawings the frame which supports the caster wheel comprises a base portion 1, having downwardly extending side flanges 2, 2. The base and flanges are preferably integral and are preferably pressed to shape from strong sheet metal such as steel.

The base portion 1 of the frame is provided with openings 3 therethrough through which screws or other fastening devices may be extended to fixedly secure the caster in position beneath a truck or other object to be supported. Stiffening ribs 4 may be provided to extend transversely of base 1; these preferably being pressed from the metal. Bosses 5 are also preferably pressed downwardly from the metal to surround the opening 3.

The side flanges 2 of the frame are preferably each provided with a central downwardly extending curved portion 6 and with end portions 7 which may be approximately plane and parallel to each other. The central portions 6 of the flanges are curved outwardly in cross section, this curvature merging towards the base into the approximately straight end portions 7. The arched or curved portions 6 are preferably provided with inclined side edges as is indicated at 8 so that these supporting portions of the side flanges are in effect triangular.

The portions 6 of the side flanges are provided with alined openings therethrough adjacent their lower ends through which the axle member 9 of the caster is extended. This axle member preferably takes the form of a split tube as shown, the ends of which are securely fastened to the side flanges of the frame. Preferably this is accomplished by pressing the end portions of tube 9 radially outwardly to form a flange or enlargement 10 at each end of the tube. These flanges are pressed against the outer surfaces of the portions 6 of the side flanges of the frame so as to resist any outward movement of the side flanges of the frame under the stresses to which the caster is subjected in use. Tube 9 is surrounded by a sleeve 11 which is of such a length that its end surfaces will abut against the inner surfaces of the horns or central portions 6 of the side flanges of the frame as is indicated at 12 in Fig. 2. Preferably the end surfaces of sleeve 11 are curved with the same curvature as the portions 6 of the frame side flanges against which they abut so that rotation of the sleeve will be prevented, and so that the sleeve will maintain engagement at all portions of its end surfaces with the inner surfaces of the frame side flanges. With this construction the sleeve 11 acts as a strut member to prevent any increased movement of the portion 6 of the frame, so that the frame is stiffened and enabled to resist stress in all directions.

The caster wheel 13 is mounted on the sleeve 11 to rotate between the horns or central portions 6 of the frame. This wheel may be of any suitable construction adapted to be sufficiently strong for the service in which it is to be used. The provision of the two members 9 and 11 on which the wheel is mounted insures a sufficiently strong and rigid bearing for the wheel. In the use of the caster the sleeve member 11 may be worn away to a considerable extent without impairing the strength of the bearing to any dangerous degree.

As an improved detail of construction I have provided a means for readily oiling the bearing, in my preferred construction, consisting in providing the tube 9 with a radial opening 14 therethrough intermediate its ends and providing the sleeve 11 with a radial opening 15 intermediate its ends. With this construction the bearing may be oiled by simply inserting the nozzle of the oil can within the tube 9 whereupon the oil will find its way through openings 14 and 15 so as to lubricate the engaging surface of the wheel hub and the exterior of sleeve 11.

To assemble the construction it is only necessary to position sleeve 11 between the side flanges of the frame with wheel 13 mounted thereon and then to extend tube 9 through the sleeve and the alined openings in the side flanges of the frame, and then upset or press radially outwardly the end portions of tube 9 into contact with the outer surfaces of the side frame flanges. It should be understood that my invention is not limited strictly to the details of construction described but is as broad as is indicated by the accompanying claims.

What I claim is:

1. In a caster, the combination of a frame having a base portion and downwardly extending side portions having aligned openings therein, an axle member extending into said openings and secured to said frame side portions, a fixed sleeve on said axle member having its ends closely engaging against the inner surfaces of said frame side portions to prevent any inward movement thereof and a wheel rotatably mounted on said sleeve.

2. In a caster, the combination of a frame having a base portion and downwardly extending side portions having aligned openings therein, an axle member extending into said openings and secured to said frame side portions, a fixed sleeve on said axle member and a wheel rotatably mounted on said sleeve, said axle member having collar portions on its outer ends engaging against the outer surfaces of said frame side portions and said sleeve having its ends extending beyond said wheel and closely engaging against the inner surfaces of said frame side portions, said collar portions and sleeve serving to resist all inward and outward movement of said frame side portions.

3. In a caster, the combination of a frame having a base portion and downwardly extending integral side portions, outwardly curved in cross section, a fixed axle mounted in said side portions and having surfaces engaging the inner and outer surfaces of said portions to stiffen the same and a wheel mounted on said axle.

4. In a caster, the combination of a frame having a base portion and downwardly extending side portions, a fixed axle mounted in said side portions and secured strongly thereto so as to resist all movement of the same inwardly or outwardly, and a wheel mounted on said axle.

5. In a caster, the combination of a frame having a base portion and downwardly extending integral side portions, having aligned openings therein, a tubular axle member extending through said openings with its outer end portions pressed radially outward to bear against the outer surfaces of said side portions, a fixed sleeve on said axle member having its ends engage closely against the inner surfaces of said side portions, and a wheel mounted on said sleeve.

6. In a caster, the combination of a frame having a base portion and downwardly extending integral side portions, outwardly curved in cross section, and having aligned openings therein, an axle member extending through said openings and having end portions extending radially outward to bear against the outer surfaces of said side portions, a sleeve on said axle member having its end surfaces engage against the inner surfaces of said side portions, said end surfaces being curved to conform to the curvature of said side portions, and a wheel mounted on said sleeve.

7. In a caster, the combination of a frame having a base portion and downwardly extending side portions having aligned openings therein, a tubular axle member extending through said openings and secured to said side portions, a fixed sleeve on said axle member having its ends engage closely against the inner surfaces of said side portions, said axle member and sleeve having oil openings extending through the walls thereof, intermediate the ends thereof, and a wheel rotatably mounted on said sleeve.

Signed at Newark, in the county of Essex and State of New Jersey, this 4th day of March, A. D. 1921.

WALTER F. HEROLD.